United States Patent [19]
Jones et al.

[11] 3,866,682
[45] Feb. 18, 1975

[54] PROCESS FOR CONTROLLING WATER AND GAS CONING

[75] Inventors: Lloyd G. Jones; Nathan Stein, both of Dallas, Tex.

[73] Assignee: Mobil Oil Corporation, New York, N.Y.

[22] Filed: Oct. 12, 1972

[21] Appl. No.: 297,174

[52] U.S. Cl. ................................ 166/285, 166/292
[51] Int. Cl. ............................................ E21b 33/00
[58] Field of Search ............ 166/281, 285, 292–295, 166/305 R

[56] References Cited
UNITED STATES PATENTS

| | | | |
|---|---|---|---|
| 2,368,424 | 1/1945 | Reistle | 166/292 |
| 2,546,256 | 3/1951 | Bankson | 166/294 |
| 2,713,906 | 7/1955 | Allen | 166/305 R |
| 2,784,787 | 3/1957 | Matthews et al. | 166/292 |
| 3,014,530 | 12/1961 | Harvey et al. | 166/295 |
| 3,310,110 | 3/1967 | Martin | 166/292 |
| 3,369,603 | 2/1968 | Trantham | 166/294 |
| 3,525,398 | 8/1970 | Fisher | 166/295 |
| 3,542,132 | 11/1970 | Muirhead | 166/292 |

*Primary Examiner*—Frank L. Abbott
*Assistant Examiner*—Jack E. Ebel
*Attorney, Agent, or Firm*—C. A. Huggett; Henry L. Ehrlich

[57] ABSTRACT

This specification discloses a method for controlling the ratio of fluids produced from a subsurface formation having a hydrocarbon-bearing portion and another fluid-bearing portion. A well penetrates the formation and communicates with it through an open production interval. A barrier which is shaped as a hollow frustum is formed in the hydrocarbon-bearing portion of the formation about the well with the small portion of the frustum being formed such that it closes about the well in close proximity to the interface formed between the hydrocarbon-bearing portion and the other fluid-bearing portion of the formation. The small portion of the frustum may extend into the other fluid-bearing portion of the formation. Hydrocarbons are produced from the formation and the barrier reduces the flow of fluid from the other fluid-bearing portion to the well.

5 Claims, 4 Drawing Figures

PROCESS FOR CONTROLLING WATER AND GAS CONING

BACKGROUND OF THE INVENTION

This invention relates to the production of hydrocarbons from a hydrocarbon-bearing formation. More particularly, this invention relates to controlling the ratio of fluids which are produced via a well from a subsurface formation which has a hydrocarbon-bearing portion and another fluid-bearing portion.

In the production of hydrocarbons from a hydrocarbon-bearing formation there is normally provided a well which extends from the surface of the earth into the formation. The hydrocarbon-bearing portion of the formation may be a petroleum-bearing portion that is overlain by a gas-bearing portion and may be underlain by a water-bearing portion of the formation. Also, the hydrocarbon-bearing portion of the formation may be a gas-bearing portion that is underlain by a water-bearing portion of the formation. The well may be completed by employing conventional completion practices such as running and cementing casing in the well and forming perforations through the casing and cement sheaths around the casing, thereby forming an open production interval which communicates with the formation. In the case of a petroleum-bearing formation it is normally desirable to form the open production interval such that it communicates with the petroleum-bearing portion of the formation but does not extend into and communicate with the gas-bearing portion or the water-bearing portion. However, the open production interval which is formed in the well may inadvertently communicate with either or both the gas-bearing portion which overlies the petroleum-bearing portion and the water-bearing portion which underlies the petroleum-bearing portion of the formation. Even if there is no actual initial fluid communication between the open production interval and the oil- or gas-bearing portions of the formation, such communication may develop during production of petroleum from the petroleum-bearing portion of the formation. For example, in the case of a gas-bearing portion overlying the petroleum-bearing portion of the formation, gas may be drawn down from the gas-bearing portion into the petroleum-bearing portion during production of petroleum from the well. This drawing down of the gas into the petroleum-bearing formation surrounding the well is commonly referred to as gas coning. Likewise, water may be drawn upward from the water-bearing portion into the oil-bearing portion about the well. This phenomenon is known as water coning. In the case of gas coning, free gas is produced by the well, resulting in a high gas-oil ratio. This is undesirable because the reservoir energy is wasted which consequently results in a rapid decline of pressure. In the case of water coning, free water is produced in the well which results in a much higher water-to-oil ratio in the production stream than would be the case without the water coning. The higher water-to-oil ratio is undesirable and results in increased operating costs.

Various techniques have been employed to counteract the effects of gas and water coning. One such technique involves completing the production well by providing an open production interval which communicates with the petroleum-bearing portion of the formation but which does not communicate with either the gas-bearing portion of water-bearing portion which may overlie or underlie the petroleum-bearing portion of the formation. The well may then be produced at a sufficiently low rate that coning of either the gas or water into the petroleum-bearing formation and about the well is avoided. However, such production rates may be lower than are otherwise desirable.

Other methods which may be employed to reduce the effects of gas and water coning include the placing of barriers within the subsurface formations penetrated by wells. One such method of preventing the flow of water or gas into oil wells involves creating a substantially horizontal barrier which extends radially outward from the well into the oil zone of the oil-bearing formation. The barrier is located between the perforations through which oil flows into the well and the zone of the fluid which is to be blocked. The flow of water upwardly or of gas downwardly to the perforations through which the oil is produced is restricted by the barrier. Portland cement is commonly used as a barrier-forming material. For various reasons, however, substantial water may flow through or around these barriers to the perforations through which the oil is produced into the well. U.S. Pat. No. 3,237,690 to Jacy C. Karp, et al., is directed to the creation in an oil zone of a thin, substantially horizontal, highly impermeable barrier of portland cement which is bound by strata of the formation which have had their permeability permanently destroyed by a plugging material.

A method of forming a plastic pancake barrier between an oil and water zone is described in The Oil and Gas Journal, July 11, 1960, Vol. 58, No. 28, p. 71. In accordance with this technique, a low viscosity plastic is squeezed into well perforations at the water-oil contact to form an impermeable pancake or cylinder of plastic at the water-oil contact. The low viscosity plastic was forced at less than fracturing pressure into the pores of the formation.

Still another method of decreasing the ratio of gas and/or water produced along with oil in a well is described in U.S. Pat. No. 3,368,624 to George J. Heuer, Jr., et al. Heuer, et al., form a foam plug in situ in the path of the gas or water. This foam plug is formed by injecting a foaming agent into a subterranean formation surrounding a wellbore and placing the well on production. Heuer, et al., state that it is preferred that the foaming agent be injected such that it primarily enters the formation near the interface of the water- and oil-producing zones or the interface of the gas- and oil-producing zones, or both; and, still more preferably, that the foaming agent is injected directly into the water zone or the gas zone.

SUMMARY OF THE INVENTION

This invention is directed to a method of controlling the ratio of fluids produced via a well from a subsurface formation having a hydrocarbon-bearing portion and another fluid-bearing portion. A barrier which is shaped as a hollow frustum is formed about the well with the small portion of the frustum being closed about the well in close proximity to the interface between the hydrocarbon-bearing portion and the other fluid-bearing portion. Hydrocarbons are produced via the well from the hydrocarbon-bearing portion of the formation.

Another embodiment is directed to a method of controlling the water-hydrocarbon ratio of fluids produced via a cased well from a subsurface formation having a hydrocarbon-bearing portion and an underlying water-bearing portion. There is provided in the cased well an open production interval which communicates with the formation, which open production interval extends upward from a lower portion of the hydrocarbon-bearing portion for at least 10 percent of the thickness of the hydrocarbon-bearing portion. A first fluid barrier-forming material is injected via the open production interval into the hydrocarbon-bearing portion. A second fluid is injected via the open production interval into the hydrocarbon-bearing portion to displace the first fluid barrier-forming material into the shape of a hollow frustum closed about the well at about the interface between the petroleum-bearing portion and the water-bearing portion and forming a barrier shaped as a hollow frustum. Hydrocarbons are produced from the hydrocarbon-bearing portion via the open production interval of the well.

DESCRIPTION OF THE PREFERRED EMBODIMENTS

This invention is directed to methods of controlling the ratio of fluids produced via a well from a subsurface formation having a hydrocarbon-bearing portion and another fluid-bearing portion. The hydrocarbon-bearing portion may contain primarily liquid hydrocarbons, e.g., petroleum, or gaseous hydrocarbons. In the case where the hydrocarbon-bearing portion contains primarily petroleum, the other fluid-bearing portion may be a water-bearing portion underlying the petroleum-bearing portion or may be a gas-bearing portion overlying the petroleum-bearing portion. In the case where the hydrocarbon-bearing portion contains primarily gaseous hydrocarbons, the other fluid-bearing portion may be a water-bearing portion underlying the hydrocarbon portion.

In accordance with an embodiment of this invention, a barrier that is shaped as a hollow frustum is formed in the formation. The small end of the frustum is formed about the well in close proximity to the interface between the hydrocarbon-bearing portion and the other fluid-bearing portion. The hollow frustum-shaped barrier extends into and terminates within the hydrocarbon-bearing portion of the formation and hydrocarbons are produced via the well from the hydrocarbon-bearing portion of the formation. The frustum-shaped barrier prevents or reduces the flow of fluid from the other fluid-bearing portion of the formation, thereby controlling the ratio of the hydrocarbons to the fluid from the other fluid-bearing portion that is produced from the formation via the well.

This invention is particularly applicable to controlling the ratio of petroleum-to-water, petroleuem-to-gas, and gas-to-water that is produced from hydrocarbon-bearing formations that are subject to water coning and gas coning problems. For convenience and simplicity, this invention is described primarily with reference to controlling the petroleum-to-water ratio that is produced via a well that penetrates a formation having a petroleum-bearing portion underlain by a water-bearing portion.

Figure 1:
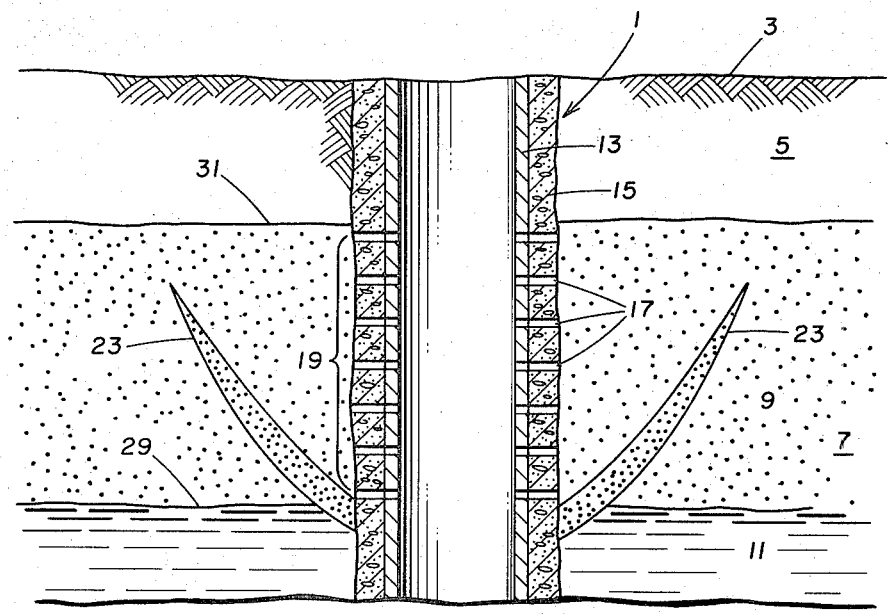
FIG. 1 is a diagrammatic vertical sectional view of a subsurface formation penetrated by a well illustrating a hollow frustum barrier formed to prevent water coning.

With reference to FIG. 1 there is illustrated a well 1 which extends from the surface of the earth 3 through an overburden 5 and penetrates a subsurface formation 7. This subsurface formation 7 includes a petroleum-bearing portion 9 and a water-bearing portion 11. The well 1 is equipped with casing 13 which is bonded to the walls of the well by cement sheath 15. Perforations 17 extend through casing 13 and cement sheath 15 and form an open production interval 19 that provides for fluid communication between the interior of well 1 and petroleum-bearing portion 9. Preferably, this open production interval 19 terminates above the water-bearing portion 11.

In accordance with an embodiment of this invention there is formed in formation 7 a hollow frustum-shaped barrier 23 which closes at its small end about well 1 in close proximity to the interface 29 between the petroleum-bearing portion 9 and the water-bearing portion 11. This frustum-shaped barrier 23 extends into and terminates within petroleum-bearing portion 9. The frustum-shaped barrier 23 extends laterally from well 1 and terminates at a sufficient distance therefrom to ensure that the open perforation interval 19 communicates relatively freely with the petroleum-bearing portion 9. The frustum-shaped barrier 23 extends vertically above interface 29 a sufficient distance to reduce or block the flow of water from water-bearing portion 11 through open perforation interval 19 into well 1. Preferably, frustum-shaped barrier 23 extends vertically above interface 29 to a height of approximately the height to which water will cone upward from water-bearing portion 11 under the maximum flow potential that the well will be subjected to during sustained production of petroleum from petroleum-bearing portion 9. Desirably, the frustum-shaped barrier 23 extends only to a sufficient height to greatly reduce or block the flow of water from water-bearing portion 11 into well 1 while leaving unblocked a sufficient thickness of the petroleum-bearing portion 9 to ensure that petroleum from petroleum-bearing portion 9 may flow to well 1. Normally, the frustum-shaped barrier 23 will terminate laterally from well 1 at a distance of 10 to 20 feet and will terminate vertically above interface 29 at a distance of 10 percent to 90 percent of the thickness of petroleum-bearing portion 9. Frustum-shaped barrier 23 may be formed of any barrier-forming material which may be placed into the formation. The frustum-shaped barrier 23 need not be completely impermeable to water to be effective, but need only to offer a high resistance to the flow of water. Various barrier-forming materials which may be employed in forming the frustum-shaped barrier 23 include aqueous solutions of sodium silicate and urea, liquid plastics, portland cement slurries, sodium silicate with formamide added, various aqueous gels, and asphaltic materials.

Figure 2:
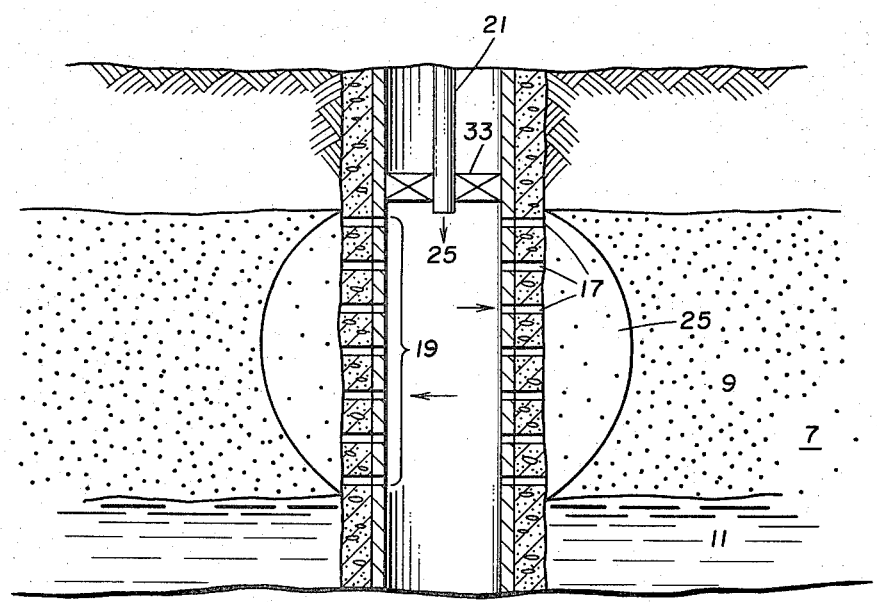
FIGS. 2, 3, and 4 are diagrammatic vertical sectional views of a subsurface formation penetrated by a well which illustrates embodiments of this invention directed to forming hollow frustum barriers to prevent water coning.
Figure 3:
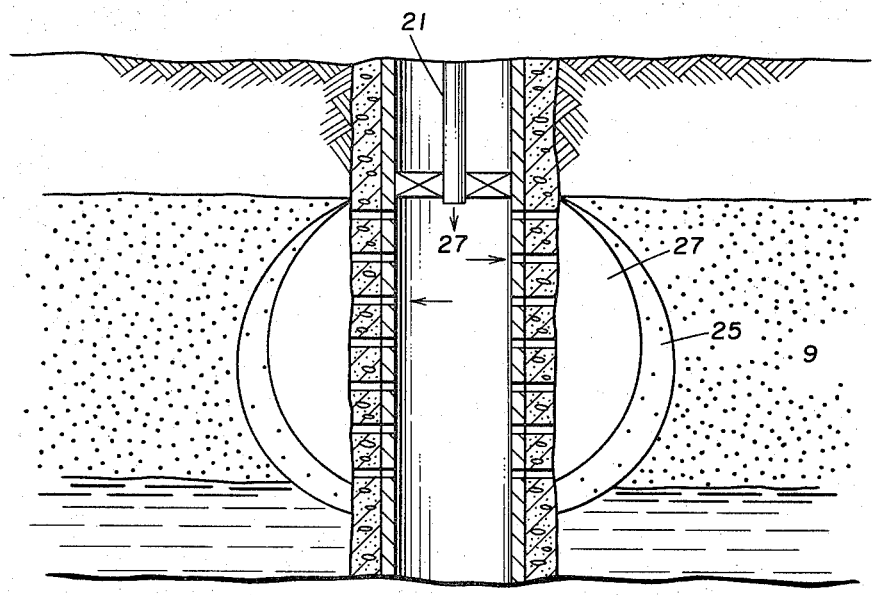
Figure 4:
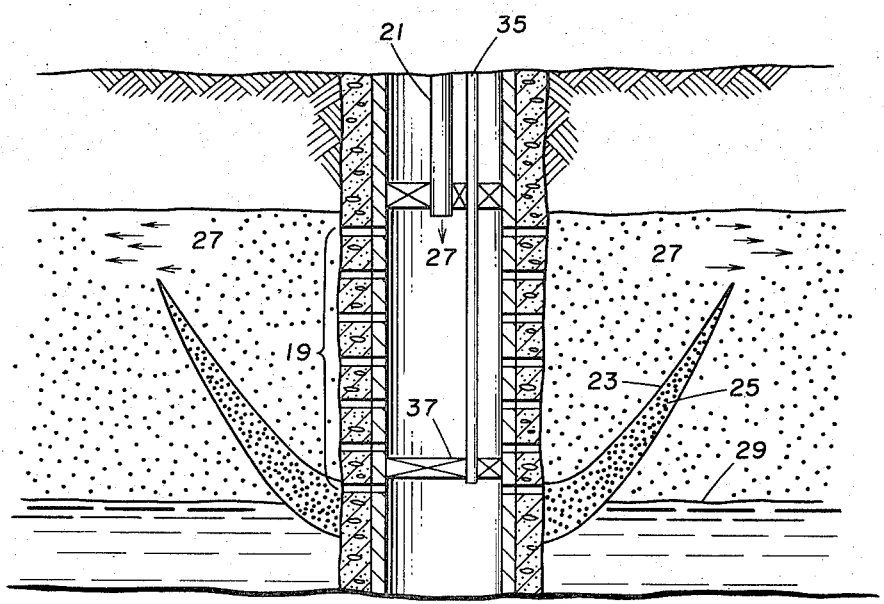

A method by which the frustum-shaped barrier 23 may be formed is described with reference to FIGS. 2, 3, and 4. Referring to FIG. 2, a first fluid barrier-forming material 25 is injected down tubing 21 and through perforations 17 of open production interval 19 and into the petroleum-bearing portion 9 of formation 7. A packer 33 may be set about tubing 21 in well 1 above open production interval 19 to aid in injecting barrier-forming fluid 25 into petroleum-bearing portion 9. Thereafter, a second fluid 27 is injected down tubing 21 in well 1 and into petroleum-bearing portion 9, as illustrated in FIG. 3. The injection of fluid 27 down tubing 21 displaces fluid 25 from well 1 through the open production interval 19 and into the petroleum-bearing portion 9. The fluid 27 preferentially forces the fluid 25 from well 1 through the lower portion of open production interval 19, thereby concentrating the amount of fluid 25 near the interface 29 while simultaneously the fluid 27 preferentially flows through the upper portion of open production interval 19 and into petroleum-bearing portion 9. Injection of the second fluid 27 is continued until it displaces first barrier-forming fluid 25 into petroleum-bearing portion 9 and breaks through the barrier-forming fluid 25 at an upper location as illustrated in FIG. 4. The second fluid 27 breaks through and tends to overflush the first fluid 25 and position the first fluid 25 in the shape of a hollow frustum as illustrated in FIG. 4 primarily because of the phenomenon that the fluid 27 preferentially forces the fluid 25 from well 1 through the lower portion of the open production interval 19 while simultaneously the fluid 27 preferentially flows through the upper portion of the open production interval 19 and into petroleum-bearing portion 9. Preferably, the second fluid 27 is less viscous and less dense than the first fluid 25 which further facilitates the breakthrough of the second fluid 27 through the first fluid 25 and the displacement of the fluid 25 into the petroleum-bearing portion 9 in the form of a hollow frustum. After displacing the barrier-forming fluid 25 into the shape of the hollow frustum it is maintained in this position a sufficient time to allow the fluid to set up and form the hollow frustum-shaped barrier 23. In displacing fluid 25 into petroleum-bearing portion 9 in the shape of a hollow frustum, a portion of the fluid 25 may be forced into water-bearing portion 11, but the primary portion of fluid 25 extends upward into petroleum-bearing portion 9.

In another embodiment, concomitantly with the injection of fluid 27 down tubing 21, there is injected an amount of fluid 25 down tubing 35 and into the lower portion of petroleum-bearing portion 9 near interface 29. A packer 37 may be employed about tubing 35 to facilitate the injection of fluid 25 into the lower portion of petroleum-bearing portion 9. This ensures that the small end of the frustum is well formed and may also extend the lower portion of barrier 23 into the water-bearing portion of the formation.

This invention has been described primarily with reference to forming a hollow-shaped frustum barrier having its small end located about a well at approximately the interface between a petroleum-bearing and water-bearing portion of the formation to mitigate the production of water into the well. This type of barrier would also be applicable to mitigating the production of water into the well where instead of a petroleum-bearing portion being underlain by a water-bearing portion there is a gas-bearing portion of the formation underlain by a water-bearing portion.

This invention may also be readily adapted to a situation where a gas-bearing portion of the formation overlies a petroleum-bearing portion of the formation to mitigate the production of gas into the well. For such a situation, the hollow frustum-shaped barrier is formed such that the small end of the frustum is located in close proximity to the interface between the gas-bearing portion and the petroleum-bearing portion of the formation. In forming the hollow frustum-shaped barrier to mitigate gas production, it may be desirable to inject the second fluid 27 down a tubing and into well 1 near a lower location of open production interval 19. This will facilitate the forming of the hollow frustum-shaped barrier having its small end closed about the well at the proximity of the interface between the gas-bearing portion and the petroleum-bearing portion of the formation. Employing a second fluid 27 having a density greater than the density of the first fluid 25 will further facilitate the forming of the frustum-shaped barrier for mitigating the production of gas. It may be desirable to inject an additional amount of fluid 25 near the interface between the gas-bearing portion and the petroleum-bearing portion of the formation to ensure that the small end of the barrier is well formed at the interface between the gas-bearing portion and petroleum-bearing portion.

We claim:

1. A method of controlling the water-petroleum ratio of fluids produced via a cased well from a subsurface formation having a petroleum-bearing portion and an underlying water-bearing portion, said cased well having an open production interval communicating with said petroleum-bearing portion, comprising:
   a. injecting via said open production interval into said petroleum-bearing portion a first fluid barrier-forming material;
   b. injecting via said open production interval into said petroleum-bearing portion a second fluid to displace said first fluid barrier-forming material into the shape of a hollow frustum having the small end of said hollow frustum closed about said well at about the interface between said petroleum-bearing portion and said water-bearing portion;
   c. maintaining said first fluid barrier-forming material in the shape of said hollow frustum to form a barrier shaped as a hollow frustum; and
   d. producing petroleum from said petroleum-bearing portion via said open production interval of said well.

2. The method of claim 1 wherein said second fluid is less dense than said first fluid.

3. The method of claim 2 wherein concomitantly with step (b) there is injected via a lower portion of said open production interval into said petroleum-bearing portion an additional amount of said first fluid barrier-forming material.

4. A method of controlling the gas-petroleum ratio of fluids produed via a cased well from a subsurface formation having a petroleum-bearing portion and an overlying gas-bearing portion, said cased well having an open production interval communicating with said petroleum-bearing portion, comprising:
   a. injecting via said open production interval of said well a first fluid barrier-forming material;
   b. injecting via said open production interval of said well a second fluid having a density greater than said first fluid barrier-forming material to displace said first fluid barrier-forming material into said petroleum-bearing formation in the position of a hollow frustum about said well and forming a barrier shaped as a hollow frustum; and
   c. producing petroleum from said petroleum-bearing portion via said open production interval and said well.

5. The method of claim 4 wherein said second fluid is preferentially injected via the lower portion of said open production interval of said well.

* * * * *